United States Patent [19]

Gotoh

[11] Patent Number: 4,860,121

[45] Date of Patent: Aug. 22, 1989

[54] DETECTOR CIRCUIT FOR DETECTING DROP-OUT IN REPRODUCED DIGITAL DATA

[75] Inventor: Toshio Gotoh, Saitama, Japan

[73] Assignee: Pioneer Electronic Corporation, Tokyo, Japan

[21] Appl. No.: 169,669

[22] Filed: Mar. 18, 1988

[30] Foreign Application Priority Data

Mar. 20, 1987 [JP] Japan .................................. 62-67315
Mar. 20, 1987 [JP] Japan .................................. 62-67316

[51] Int. Cl.⁴ ............................................ H04N 5/76
[52] U.S. Cl. .................................... 358/336; 360/38.1
[58] Field of Search ............... 358/314, 336; 360/33.1, 360/38.1, 39

[56] References Cited

U.S. PATENT DOCUMENTS

| | | | |
|---|---|---|---|
| 4,498,104 | 2/1985 | Schulz | 358/314 X |
| 4,591,925 | 5/1986 | Trytko | 358/336 |
| 4,760,470 | 7/1988 | Wagner et al. | 358/314 |

Primary Examiner—Robert L. Richardson
Attorney, Agent, or Firm—Sughrue, Mion, Zinn, Macpeak & Seas

[57] ABSTRACT

A drop-out detector circuit for use in a data reproducing device in which a reproduced high-frequency signal is digitized. The most significant bit of the digitized signal is sampled, and its logic state detected over a predetermined number of sampling periods. Both high- and low-frequency drop-outs can be detected from the detected logic state pattern of the most significant bit.

6 Claims, 3 Drawing Sheets

DETECTOR CIRCUIT FOR DETECTING DROP-OUT IN REPRODUCED DIGITAL DATA

BACKGROUND OF THE INVENTION

The present invention relates to drop-out detector circuits, and in particular to a drop-out detector circuit in devices for playing back recorded data which digitize a high-frequency signal read from a recording medium.

In the prior art, playback devices for recorded data, for example, disc players that play video discs pre-recorded with FM-modulated image signals, usually make use of an analog system for processing the FM image signals read from the disc.

However, in view of the increased use of integrated circuits, there are many advantages in using digital rather than analog processing, and in order to enable greater functional diversity in the processing of signals and to achieve better picture quality, the applicant has already proposed (see Japanese Patent Application No. 60-280711) a playback device for recorded data which digitally processes signals read from a disc.

However, in a playback device for recorded data such as a video disc player, the presence of dirt or damage to the recording medium causes gaps, i.e., drop-out, in the signal read from the recording medium, and it is necessary to detect and compensate for these drop-outs.

SUMMARY OF THE INVENTION

In view of the above-mentioned points, the purpose of the present invention is to provide a drop-out detection circuit able to accurately detect drop-out using a simple circuit arrangement in a recorded data playback device which uses digital signal processing.

In accordance with the above and other objects, a drop-out detector circuit of the present invention is arranged so that, in a playback device for recorded data which employs digitization of signals read from the recording medium, most significant bit data are sampled from the digitized signal read out, and drop-outs are detected based on the modulation pattern of these most significant bits.

In accordance with another embodiment of the drop-out detector circuit in the invention, the digitized read-out signal is delayed by the equivalent of one sampling period, the pre-delay signal is then subtracted from the post-delay signal, the most significant bit data is sampled, and drop-out detected when the most significant bit repeats a specified number of times in the same logic state. In other words, drop-out is detected when the increase or decrease in the signal level of the digitized read-out signal is repeated for more than a specified number of sampling times.

DESCRIPTION OF THE PREFERRED EMBODIMENTS

A first preferred embodiment of the invention will now be described in detail with reference to the drawings.

Figure 1:
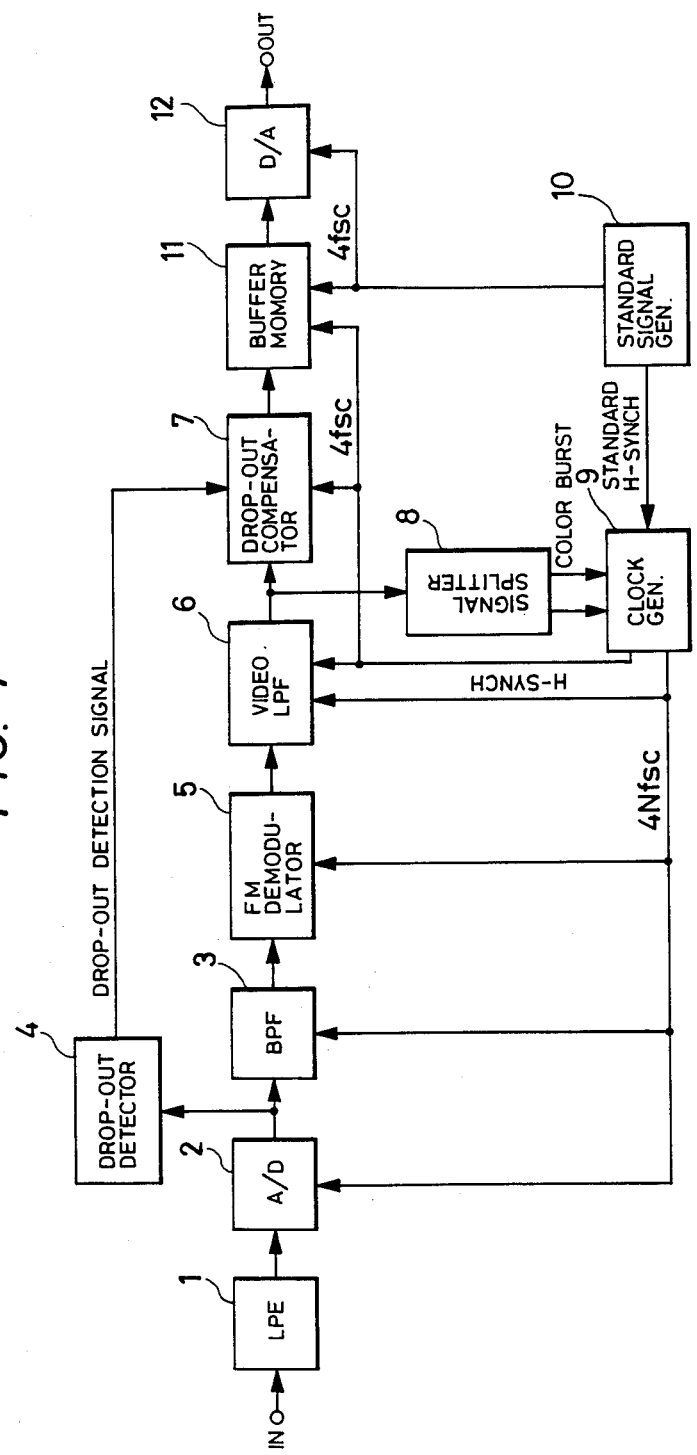
FIG. 1 is a block diagram showing schematically a device for reproducing recorded data provided with a drop-out detection circuit according to the invention.

FIG. 1 is a block diagram showing schematically a device for playing back recorded data provided with a drop-out detection circuit according to the invention. As shown in this figure, an FM image signal read from a video disc or other recording medium is passed through an analog LPF (Low-pass filter) 1 and fed to an A/D converter 2. The LPF 1 is provided to remove return distortion from the A/D converter. The digitized FM image signal output from the A/D converter 2 is supplied to a digital BPF (bandpass filter) 3 and a drop-out detector circuit 4 constructed according to the invention. The digital BPF 3 extracts from the A/D converter output, which also contains FM audio signals, only those components required for demodulation of the image signal, and applies them to the next stage, an FM demodulator circuit 5. The FM demodulator circuit 5 may employ, for example, an arrangement proposed in commonly assigned Japanese Patent Application No. 59-262481. The output of the FM demodulator circuit 5 then passes to a video LPF 6 where the baseband components of the image signal are extracted. The digitized image signal passing through the video LPF 6 is supplied to a drop-out compensator circuit 7 and a signal splitter 8. The drop-out compensator circuit 7 responds to drop-out detecting signals supplied by the drop-out detector circuit 4 so as to compensate for signal drop-outs.

The signal splitter circuit 8 splits out, for example, the horizontal synchronizing signal and the color burst signal contained in the digitized image signal, and applies them to the clock generator circuit 9. The clock generator circuit 9 produces a $4f_{sc}$ ($f_{sc}$ is the subcarrier frequency) and a $4Nf_{sc}$ (N is any integer greater than 1, for example 3) clock based on the horizontal synchronizing signal or the color burst signal received from the signal splitter circuit 8 or a reference horizontal synchronizing signal supplied from a reference signal generator circuit 10. A PLL (phaselocked loop) circuit is thus formed. The $4f_{sc}$ and $4Nf_{sc}$ clocks are used for digital processing, the $4Nf_{sc}$ clock being used as the sampling clock for the A/D converter 2 and the signal processing clock up to video LPF 6, and the $4f_{sc}$ clock is used for down sampling of the output for video LPF 6.

The digitized image signal output from the drop-out compensator circuit 7 is written into the buffer memory 11 using the $4f_{sc}$ clock produced by the clock generator circuit 9 based on the color burst signal extracted from the reproduced image signal. Data is read out from the buffer memory 11 using the $4f_{sc}$ reference clock from the reference clock generator circuit 10. In this way, by reading data from the buffer memory 11 using a stable clock that is unrelated to the reproduced image signal, jitter in the displayed image signal can be absorbed. The digitized image signal read from the buffer memory 11 is converted back to an analog signal by a D/A (digital-/analog) converter 12 and output as the reproduced image signal.

Figure 2:
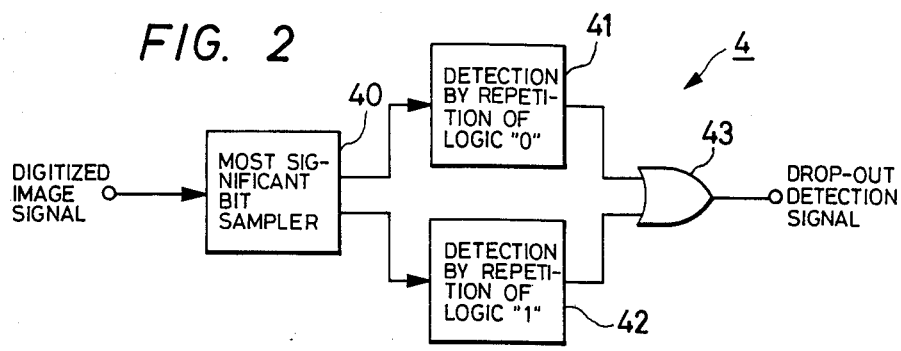
FIG. 2 is a block diagram illustrating a first preferred embodiment of the drop-out detector circuit of the invention.

FIG. 2 is a block diagram illustrating a preferred embodiment of the drop-out detector circuit according to the present invention. As shown in this figure, the digitized image signal output by the A/D converter 2 is fed to the most significant bit sampler circuit 40, where the most significant bit data is sampled. The most significant bits (1, 0) of the digitized image output correspond to the polarity of the signal, for example, for two's complement data, logic "0+ represents a positive amplitude and "1" a negative amplitude. The data for the most significant bit is fed to the primary and secondary detector circuits 41, 42. The primary and secondary detector circuits 41, 42 are composed of counters or the like, and are employed for detecting that the most significant bit has repeated in the same state a specified number of times. The primary detector circuit 41 detects repetitions of logic "0" and the secondary detector circuit that of logic "1". The output of the detector circuits 41, 42 is supplied through an OR gate 43 as a drop-out detector signal to the drop-out compensator circuit 7 (FIG. 1).

Figure 3:
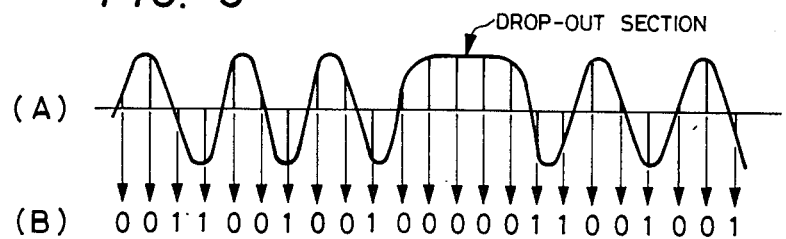
FIG. 3 is a waveform diagram illustrating inputs and outputs, including low frequency components, of the A/D converter in FIG. 1.

In operation, as shown in FIG. 3 at (A), there are times when there is present a low frequency component in the signal read from the disc. When a low frequency element due to drop-out occurs, the most significant bit logic "1" or "0" of the digitized image signal extends continuously for a longer period, as shown in FIG. 3 at (B), than is the case when there is not drop-out. Thus, when the most significant bit sampler circuit 40 and the detector circuits 41, 42 detect the fact that the most significant bit has continued at "1" or "0" for a specified number of times (in the embodiment of FIG. 3, for example, five times) drop-out is indicated.

Figure 4:
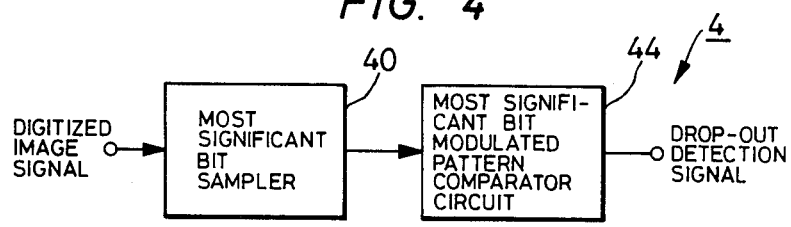
FIG. 4 is a block diagram of a second embodiment of the drop-out detector circuit of the invention.

FIG. 4 is a block diagram illustrating another embodiment of the present invention. This embodiment of a drop-out detector circuit employs a most significant bit sampler circuit 40, which samples the most significant bit data from the digitized image signal. A most significant bit modulation pattern comparator circuit 44, which is provided with at least one standard pattern, produces a detection output when the most significant bit modulation pattern sampled by the most significant bit sampler circuit 40 matches the standard pattern. This detection output then acts as the drop-out detector signal.

Figure 5:
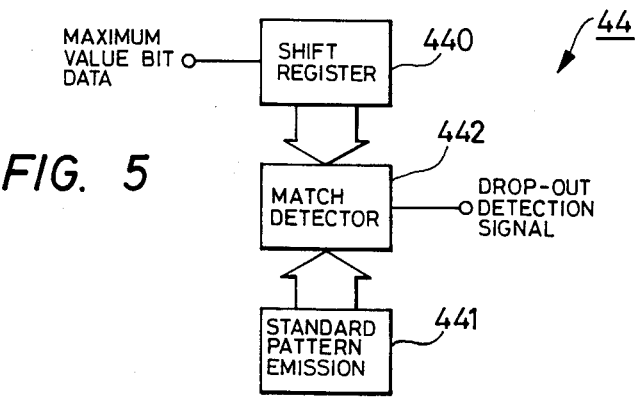
FIG. 5 is a block diagram illustrating an arrangement for the most significant bit modulation pattern comparator circuit in FIG. 4.

The most significant bit modulation pattern comparator circuit 44 is composed, as shown in FIG. 5, of a shift register 440 which stores in sequence the most significant bi data sampled by the most significant bit sampler circuit 40, a standard pattern generator circuit 441 which provides at least one standard pattern, and a match detector circuit 442 which detects a match between the respective outputs of the shift register 440 and the standard pattern generator circuit 441.

Figure 6:
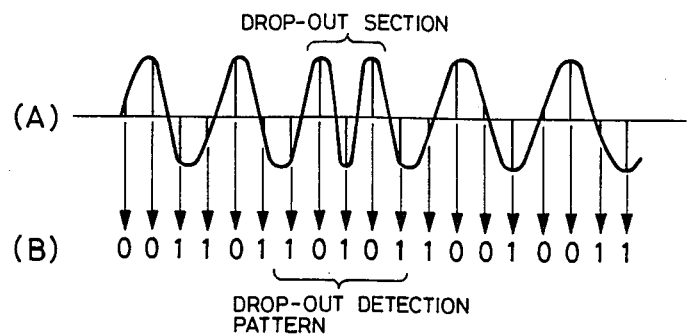
FIG. 6 is a waveform diagram illustrating inputs and outputs, including high frequency components, of the A/D converter in FIG. 1.

In operation, as shown in FIG. 6 at (A), a high frequency component sometimes occurs in the signal read from the disc. However, the sampling frequency of the A/D converter 2 in FIG. 1 is set at a sufficiently high frequency such that it can reproduce high frequency components caused by drop-out. When a high frequency component caused by drop-out occurs, the modulation pattern of the most significant bit in the digitized image signal is more rapid, due to the fact that a high frequency component caused by the drop-out is sampled, than when there is no drop-out, as shown in FIG. 6 at (B). Thus, drop-out can be detected by following the modulation pattern using the most significant bit modulation pattern comparator circuit 44. For example, in the embodiment in FIG. 6, drop-out can be detected by setting one of the standard detection patterns as 10101.

In the above embodiments drop-out detector circuits for detecting low and high frequency components have been explained separately, but they may be combined to enable detection of both high and low frequency elements, which will result in greater accuracy of drop-out detection.

Figure 7:
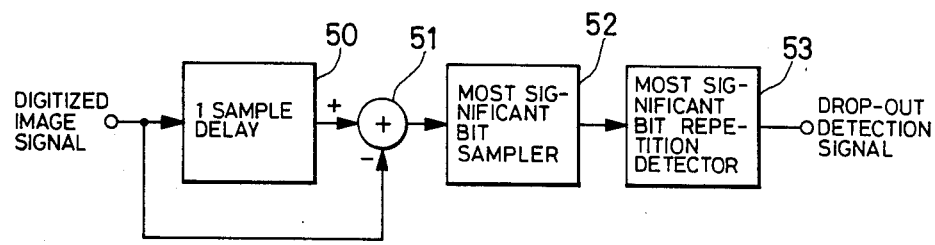
FIG. 7 is a block diagram illustrating a third embodiment of the invention.

FIG. 7 is a block diagram illustrating a third embodiment of a drop-out detector circuit 4 according to the present invention. In this figure, the digitized image signal output by the A/D converter 2 is delayed by the equivalent of one sample period by a delay circuit 50, which has a delay equivalent to one sample of the A/D converter 2, and is then fed to a subtractor 51. In the subtractor 51, the pre-delay digital image signal is subtracted from the digital image signal delayed by the delay circuit 50. The subtracted signal is supplied to a most significant bit sampler circuit 52, where the most significant bits are sampled. The logic state of the most significant bits sampled from the subtracted signal corresponds to the positive and negative polarity of the results of the subtraction operation. The most significant bit data sampled is applied to a most significant bit repetition detector circuit 53. The most significant bit repetition detector circuit 53, implemented with a counter or the like, produces a detection output when the logic state of the most significant bits is repeated a specified number of times. This detection output is supplied as drop-out detection signal to the drop-out compensator circuit 7 (FIG. 1).

Figure 8:
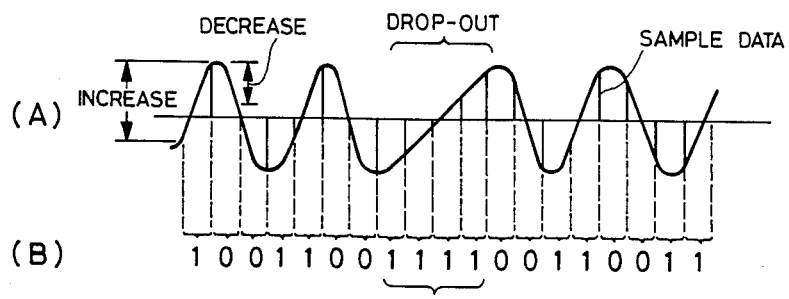
FIG. 8 is a waveform diagram illustrating inputs and outputs from the A/D convertor in FIG. 1.

In operation, as shown in FIG. 8 at (A), the repetitive cycle of positive and negative amplitude changes that should complete itself within a set period does not occur, the signal level continuing to increase or decrease. When the difference between the amplitude of the signal that has been delayed by the delay circuit 50 and the amplitude of the predelay signal, namely, the amplitude difference in one sampling period, is calculated by subtractor 41, the logic state of the most significant bits in the subtracted signal will be, for example, in two's complement form, logic "0" for a positive amplitude difference and logic "1" when the difference is negative. The positive and negative polarity of the amplitude difference will thus appear as shown in FIG. 8 at (B). When logic "1" (or logic "0") is repeated as shown in the center of the figure, this means that the level of the signal read from the disc is continuing to increase (or decrease).

Thus, when the most significant bit of the subtracted signal is sampled by the most significant bit sampler circuit 52, and the logic stage of the most significant bit is repeated for a specified number of times (in the embodiment of FIG. 8, for example, four times), in other words when the most significant bit repetition detector circuit 53 determines that the signal level is continuing to increase (or decrease) longer than is the case when where is no drop out, drop-out is indicated.

In the above embodiment, the most significant bit repetition detector circuit 53 employs a counter or the like to monitor whether the logic state of the most significant bit has repeated a specified number of times in the same logic state, but an arrangement as shown in FIG. 5 and as discussed above may also be employed. In this case, standard patterns such as 0000 and 1111 may be employed.

The above embodiments have been explained with reference to a video disc as an example of the recording medium, but the recording medium may also be video tape or other such medium as long as the desired signal has been recorded as a high-frequency modulated signal.

As explained above, since the drop-out detector circuit according to this invention is arranged so that most significant bit data are sampled from a signal that has been read from the recording medium and digitized and drop-out is detected based no the modulation pattern of these most significant bits, it is possible to detect drop-out accurately with a simple circuit arrangement.

What is claimed is:

1. A drop-out detector circuit for a device for reproducing sequentially recorded digital data from a signal recorded on a recording medium, the recorded signal comprising a high-frequency modulated signal, comprising: means for reading said signal recorded on said recording medium and producing a digitized signal therefrom; means for extracting from each of a plurality of sequential data values contained within said digitized signal at least one bit indicative of a polarity of the respective data value; and means for detecting when a sequence of a predetermined number of the bits extracted from a plurality of said sequential data values is in a predetermined bit pattern, an output of said detecting means forming a drop-out signal.

2. The drop-out detector circuit of claim 1, wherein said predetermined bit pattern comprises a plurality of data bits all in the same logic state.

3. The drop-out detector circuit of claim 1, wherein said detecting means comprises: means for storing a standard data bit pattern; and means for comparing said sequence of a predetermined number of said at least one bits extracted from a plurality of said sequential data values with said standard data bit pattern.

4. The drop-out detector circuit of claim 1, wherein said at least one bit comprises at least one most significant bit.

5. A drop-out detector circuit for a device for reproducing sequentially recorded digital data from a signal recorded on a recording medium, the recorded signal including a high-frequency modulated signal, comprising: means for reading said signal recorded on said recording medium and producing a digitized signal therefrom; means for delaying said digitized signal by a period equivalent to a period of one digital value contained therein; means for subtracting from an output of said delaying means a present digital value contained in said digitized signal; means for storing most significant bits of a predetermined number of sequential output values of said subtracting means; and means for detecting when a sequence of a predetermined number of said most significant bits stored by said storing means is in a predetermined bit pattern.

6. The drop-out detector circuit of claim 5, wherein said predetermined bit pattern is a set of data bits all in the same logic state.

* * * * *